(12) United States Patent
Montecalvo et al.

(10) Patent No.: US 7,415,732 B2
(45) Date of Patent: Aug. 19, 2008

(54) MECHANISM TO PREVENT COUNTERFEITING IN A HARDWARE DEVICE

(75) Inventors: Mark V. Montecalvo, Hillsboro, OR (US); Douglas D. Boom, Portland, OR (US); Elizabeth M. Kappler, Hillsboro, OR (US); Scott P. Dubal, Hillsboro, OR (US); Patrick L. Connor, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 269 days.

(21) Appl. No.: 11/233,833

(22) Filed: Sep. 22, 2005

(65) Prior Publication Data

US 2007/0079387 A1   Apr. 5, 2007

(51) Int. Cl.
*G06F 11/22* (2006.01)
(52) U.S. Cl. .......................... 726/34; 713/193
(58) Field of Classification Search ............... 713/193; 726/34
See application file for complete search history.

(56) References Cited

U.S. PATENT DOCUMENTS

| | | | | |
|---|---|---|---|---|
| 5,909,596 A * | 6/1999 | Mizuta | | 710/63 |
| 6,032,257 A * | 2/2000 | Olarig et al. | | 726/35 |
| 6,839,776 B2 * | 1/2005 | Kaysen | | 710/36 |
| 6,931,533 B2 * | 8/2005 | Roberts | | 713/168 |
| 7,058,811 B2 * | 6/2006 | Spain et al. | | 713/176 |
| 7,193,744 B2 * | 3/2007 | Kashihara | | 358/1.9 |
| 7,280,772 B2 * | 10/2007 | Adkins et al. | | 399/12 |
| 2001/0056534 A1 * | 12/2001 | Roberts | | 713/168 |
| 2002/0018223 A1 * | 2/2002 | Kashihara | | 358/1.2 |
| 2004/0123142 A1 | 6/2004 | Dubal et al. | | |
| 2005/0137831 A1 | 6/2005 | Dubal et al. | | |
| 2005/0138644 A1 | 6/2005 | Monteclavo et al. | | |
| 2006/0140647 A1 * | 6/2006 | Adkins et al. | | 399/12 |
| 2006/0177064 A1 * | 8/2006 | Holtzman et al. | | 380/277 |
| 2006/0242409 A1 * | 10/2006 | Reneris et al. | | 713/168 |
| 2006/0242430 A1 * | 10/2006 | Marsh et al. | | 713/190 |
| 2007/0058807 A1 * | 3/2007 | Marsh | | 380/44 |

* cited by examiner

*Primary Examiner*—Christian LaForgia
(74) *Attorney, Agent, or Firm*—Blakely, Sokoloff, Taylor & Zafman LLP

(57) ABSTRACT

A method for preventing counterfeit of a hardware device is disclosed. The method comprises determining whether a first indicator for a hardware device is set, wherein the first indicator when set indicates that the device is not a counterfeit device, and if the first indicator is not set, then activating a counter, setting a second indicator when the counter expires, and operating the hardware device in a counterfeit mode when the second indicator is set, wherein the counterfeit mode identifies the hardware device as a counterfeit device. Other embodiments are also disclosed.

21 Claims, 5 Drawing Sheets

FIG. 1

Prior Art

Prior Art

MECHANISM TO PREVENT COUNTERFEITING IN A HARDWARE DEVICE

FIELD OF THE INVENTION

The present invention relates to computer systems; more particularly, the present invention relates to preventing counterfeiting of hardware within computer systems.

BACKGROUND

Counterfeiting is a significant problem with hardware, and particularly networking hardware. For example, often times an organization will sell its Media Access Controller (MAC) and Physical Layer (PHY) chips to other vendors at a heavily discounted rate. Later, full network adapters are seen in the field with those MAC/PHY chips on them. These network adapters are counterfeits that use the left-over MAC/PHY chips that were sold at the discounted prices to the original vendors. To make matters worse, the network boards used with these MAC/PHY parts are usually made with substandard parts as well as a substandard manufacturing process, causing the network adapter to not work properly and fail early. This results in a surge of customer support calls, which are also expensive.

Detecting a counterfeit network adapter is difficult to do. The counterfeit adapters are typically identical to the real network adapters in almost every way, except workmanship and the materials used to build the adapter. Accordingly, a counterfeit prevention program implemented by an organization would be beneficial to address and eradicate counterfeits of the organization's products.

A counterfeit prevention program generally should accomplish three goals. First, creating the ability to identify a counterfeit adapter and to inform the end-user that the adapter is counterfeit. Second, leading the counterfeiters to believe that the adapters they are making are working normally so that their manufacturing behavior does not change. Third, controlling the counterfeit adapters in such a way as to direct when they cease to function.

Counterfeiting is costly to an organization because parts are sold at a discounted rate, which takes away potential sales and revenue. Counterfeit boards are typically substandard quality which creates negative goodwill, as well as increased support calls, for an organization. This problem exists for all major vendors. Thus, a mechanism to prevent counterfeiting prevention while accomplishing the above goals would be beneficial.

BRIEF DESCRIPTION OF THE DRAWINGS

The invention is illustrated by way of example and not limitation in the figures of the accompanying drawings, in which like references indicate similar elements, and in which.

DETAILED DESCRIPTION

A method and apparatus for preventing counterfeit hardware are described. In the following detailed description of the invention numerous specific details are set forth in order to provide a thorough understanding of the present invention. However, it will be apparent to one skilled in the art that the invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the following description of embodiments of the invention, network adapters and network chips are used as examples. However, one skilled in the art will appreciate that the following implementation details are not necessarily limited to a network hardware implementation. Embodiments of the invention may also apply to any piece of hardware that could be counterfeited.

In addition, in the following description of embodiments of the invention, a mechanism to prevent counterfeiting is described in terms of hardware fuses. However, one skilled in the art will appreciate that the other implementations may be utilized in lieu of hardware fuses. For example, a software mechanism may be implemented to indicate the existence of counterfeit devices. Other implementations may similarly accomplish the functions of embodiments of the invention.

Figure 1:
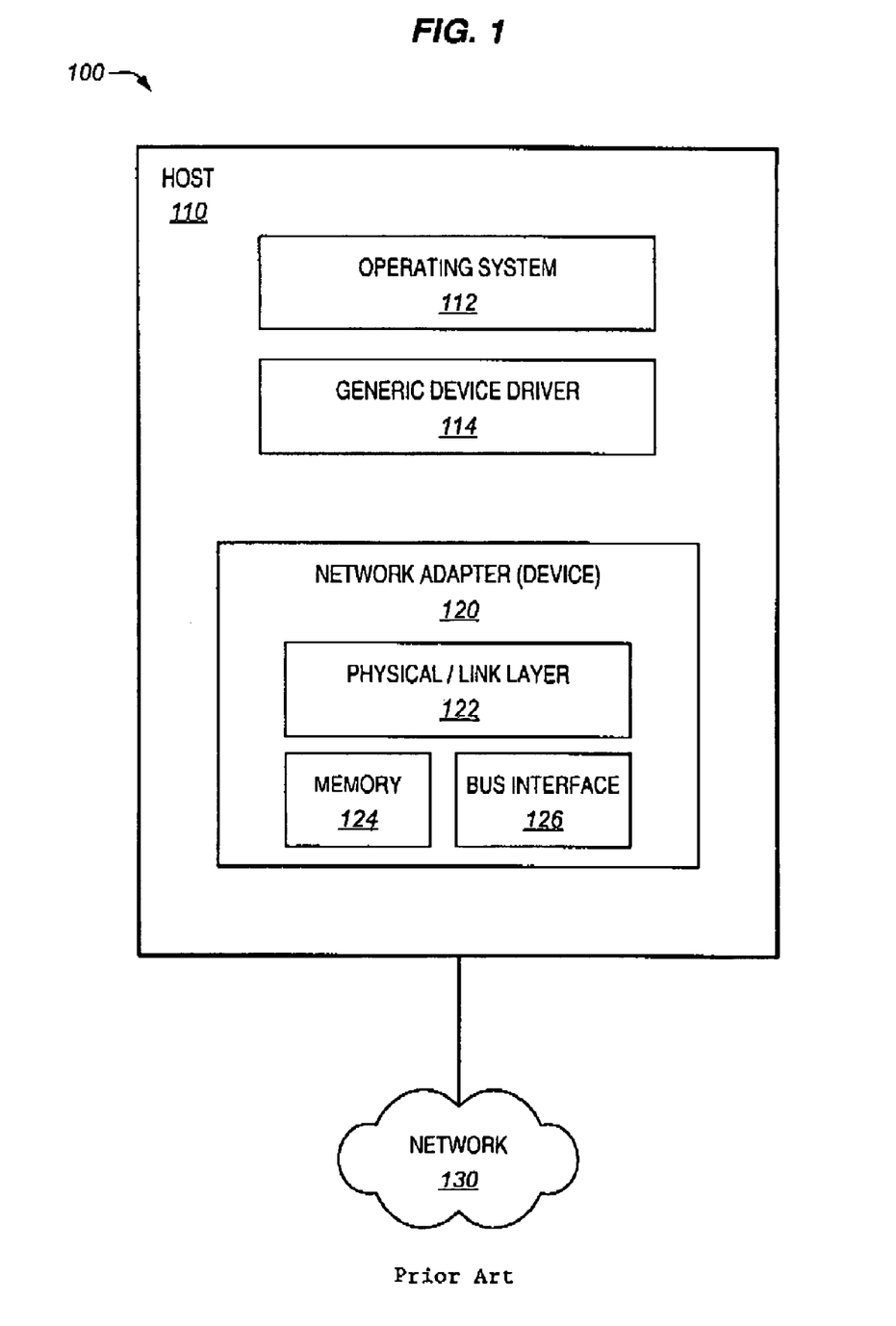
FIG. 1 is a block diagram of a network computing environment according to one embodiment of the invention.

FIG. 1 illustrates a block diagram of a network computing environment 100 in which certain embodiments of the invention are implemented. Network computing environment 100 includes a host 110 and a network adapter 120 coupled to a network 130. The network adapter 120 couples the host 110 to the network 130.

The host 110 may also include an operating system 112 and a generic device driver 114. The host 110 may further include additional applications (not shown) that call the operating system 112 to perform operations with respect to the network adapter 120. In some embodiments, the generic device driver 114 may be a driver for the network adapter 120.

As shown, the network adapter 120 includes a link layer component 122 (e.g., an Ethernet medium access controller (Mac) or Synchronous Optical Network (SONET) framer). The network adapter 120 may also include a physical layer (PHY) component 122 to handle data transmission/reception over a physical medium (e.g., copper wire, twisted wire pair cabling, coaxial cabling, fiber optic cabling, or wireless medium).

The network adapter 120 may also include a memory 124 to store packets as they arrive via the physical/link layer components 122. The network adapter 120 may further include a bus interface 126. The bus interface 126 can transfer packet data to a host memory, for example, using direct memory access (DMA) and generate an interrupt to a host processor when packet transfer is complete. The bus interface 126 may also be capable of interfacing to a Peripheral Component Interconnect (PCI) bus (e.g., PCI express), Universal Serial Bus (USB), or InfiniBand bus, among others.

Embodiments of the present invention solve counterfeiting problems through a fuse mechanism with a form of hardware-based activation. In one embodiment, two fuses are inserted into a hardware component. In some embodiments, the fuses are inserted into a networking MAC, such as a MAC component included in the link layer 122 of network adapter 120 described with respect to FIG. 1. The fuses initially start out intact and the hardware component operates normally in this state. As the hardware component operates, special on-board counters are incremented (or decremented, depending on the implementation). When the counters reach a specified number (or expire), one of the fuses is blown by the hardware component, thus signaling the hardware component is counterfeit.

Figure 2:
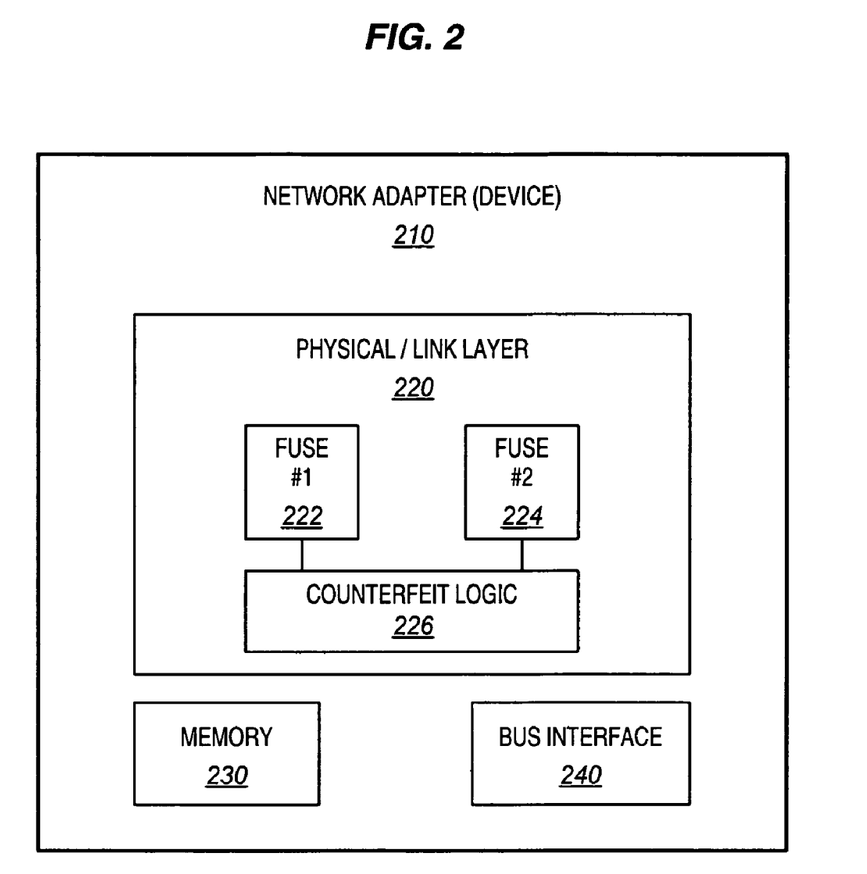
FIG. 2 illustrates a block diagram of one embodiment of a network adapter.

FIG. 2 illustrates a block diagram of a network adapter 210. In some embodiments, network adapter 210 is the same as network adapter 120 described with respect to FIG. 1. Network adapter 210 includes memory 230 and bus interface 240, which may be the same as memory 124 and bus interface 126 of FIG. 1. In one embodiment, network adapter 210 also includes a physical/link layer 220, similar to physical/link layer 122 of FIG. 1.

Embodiments of the invention introduce a counterfeit prevention mechanism by outfitting the physical/link layer component 220 with two fuses: fuse 1 222 and fuse 2 224. Fuse 1 222 and fuse 2 224 are controlled by counterfeit logic 226 to prevent counterfeiting of the physical/link layer component 220 of the network adapter 210. The combination of fuse 1 222, fuse 2 224, and counterfeit logic 226 operate together to prevent counterfeiting according to a counterfeit-prevention method detailed below with respect to FIG. 3.

Counterfeit logic 226 may be implemented in a wide variety of ways. For example, the logic 226 may be implemented as hardware (e.g., an integrated circuit chip, Programmable gat Array (PGA), Application Specific Integrated Circuit (ASIC), or a micro-controller). Counterfeit logic 226 may also be implemented as software instructions for execution by a network adapter processor (not shown). Such instructions may be disposed on a computer-readable medium such as a magnetic (e.g., hard drive, floppy disk, tape) or optical storage medium (e.g., CD-ROM, DVD-ROM) or other volatile or non-volatile memory device(s) (e.g., EEPROM, ROM, PROM, RAM, DRAM, SRAM, flash, firmware, etc.).

Figure 3:
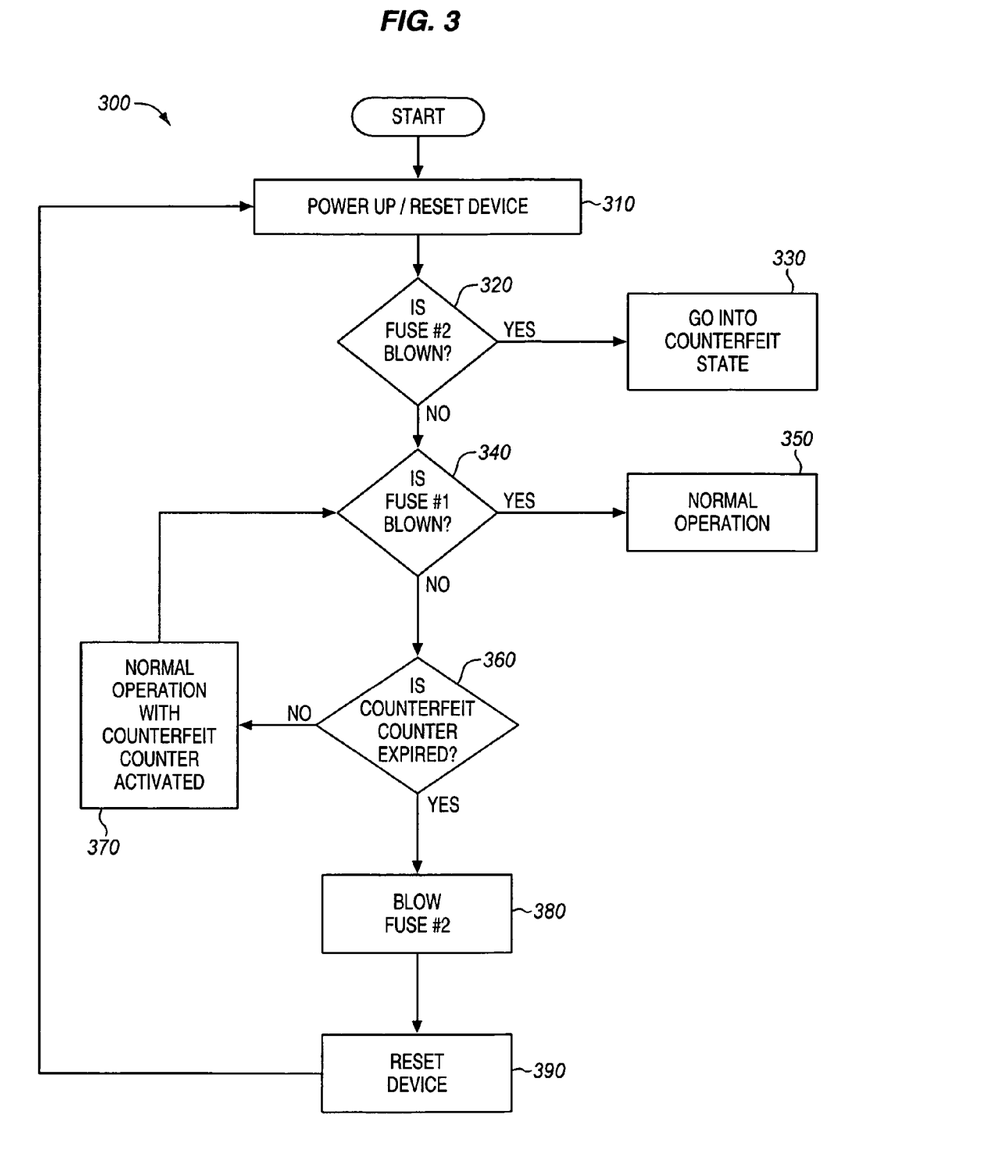
FIG. 3 is a flow diagram illustrating a method of one embodiment of the invention.

FIG. 3 is a flow diagram illustrating a method to prevent counterfeiting according to one embodiment of the invention. In one embodiment, method 300 is implemented by fuse 1 222, fuse 2 224, and counterfeit logic 226 of FIG. 2. The method begins at processing block 310 where a device, such as the network adapter 210 of FIG. 2, is powered up or reset.

Then, at decision block 320, it is determined whether a second fuse is blown. For example, in one embodiment, counterfeit logic 226 may determine whether fuse 2 224 of FIG. 2 is blown. If the second fuse is blown, then the device goes into a counterfeit mode at processing block 330. For networking hardware, this counterfeit mode may include changing the device ID stored within an EEPROM of the device to another known device ID reserved for counterfeit devices. In one embodiment, the EEPROM may be memory 230 of the network adapter 210 of FIG. 2.

Changing the device ID allows for software, such as device drivers or operating system (OS) software, to identify the device as a counterfeit networking device. For example, the device may stop working and the device manager will subsequently list the device as "Counterfeit Network Adapter." This identifies the device as an unofficial copy. In some embodiments, even if the device ID is changed in the EEPROM, on device power up the hardware may check the second fuse again, reset the device ID, and go into the counterfeit state.

If the second fuse is not blown at decision block 320, then it is determined whether a first fuse is blown at decision block 340. For example, counterfeit logic 226 may determine whether fuse 1 222 of FIG. 2 is blown. If this first fuse is blown, then the device proceeds with normal operation at processing block 350. However, if the first fuse is not blown, then the process continues to decision block 360, where a counterfeit counter is utilized.

If the counterfeit counter has not already been activated and counting (either incrementing or decrementing, depending on the implementation), then it is activated at this point. For purposes of the following description, the term 'activating' refers to not only initializing the counter, but also initiating the counting sequence. At decision block 360, it is determined whether this counterfeit counter has expired.

In some embodiments, the counterfeit counter may be embodied in and controlled by counterfeit logic 226 of FIG. 2. The counterfeit counter may be implemented in a variety of ways. For example, counterfeit counter may be implemented as software, firmware, or hardware, individually. In other embodiments, the counterfeit counter may be implemented with some combination of software, firmware, and hardware. In one embodiment, the counterfeit counter is set according to a time interval and expires upon the ending of the time interval. In other embodiments, the counter may be set according to a number of transactions to be performed by the component the counter is tracking. The counterfeit counter may either increment to a set threshold level, or decrement to its expiration. One skilled in the art will appreciate that there are a variety of implementations possible for the counterfeit counter.

If the counterfeit counter has not expired, then the device proceeds with normal operation at processing block 370 with the counterfeit counter activated and tracking the device. From processing block 370, the process returns to decision block 340, where it is determined whether the first fuse has blown, thereby allowing the device to enter into a normal operation mode.

If the counterfeit counter has expired at decision block 360, then the process continues to processing block 380, where the second fuse is blown. In one embodiment, counterfeit logic 226 of FIG. 2 operates to blow fuse 2 224. Then, at processing block 390, the device is reset and the process returns to processing block 310. At processing block 320, it should then be determined that the second fuse has blown and the device will enter the counterfeit state at processing block 330.

In one embodiment, utilizing a counterfeit counter allows for the device to operate correctly in the manufacturing environment. If the counterfeit counter utilizes a timer threshold, then, depending on that timer threshold used to trigger the fuse blow, potential counterfeiters would have to perform possibly weeks or months of stress testing in order to observe the adapter quit functioning (e.g., the internal counter is set to allow 4-8 weeks of operation before expiration). At the least, if the counterfeiters did perform this level of stress testing, the quality of their boards would increase (due to the extra testing), and the original organization may receive less negative publicity due to the counterfeit product.

Figure 4:
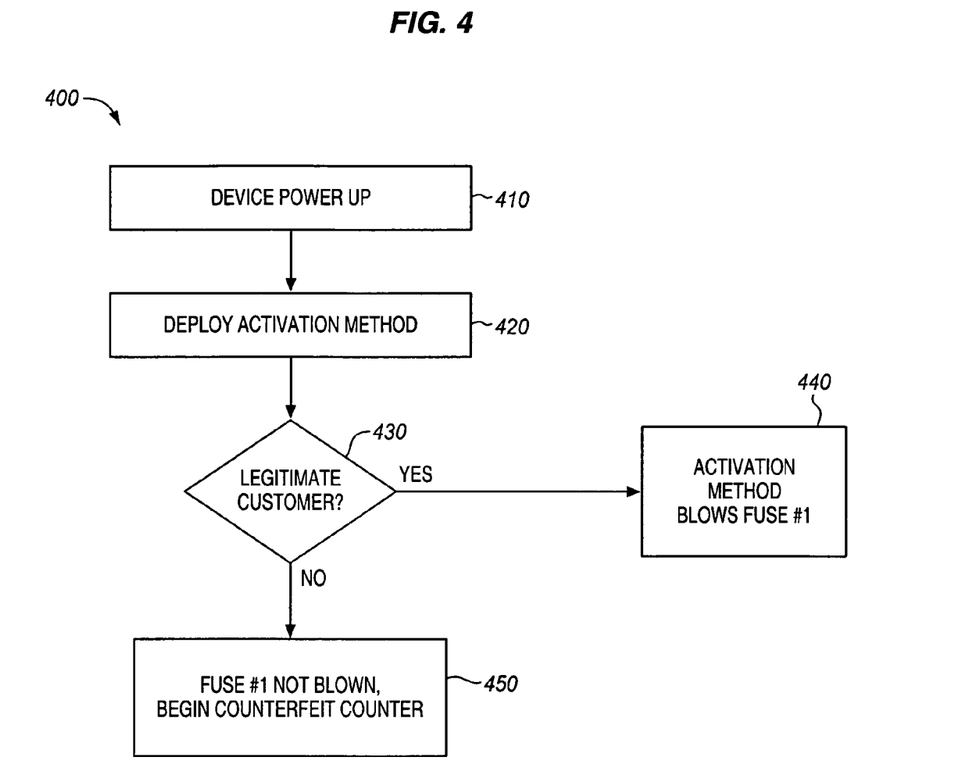
FIG. 4 is a flow diagram illustrating an activation method of one embodiment of the invention.

FIG. 4 is a flow diagram illustrating an activation method 400 of one embodiment of the invention. To prevent the device with the counterfeit-prevention fuses from entering a counterfeit mode, an activation method 400 is used for legitimate customers that are not using a counterfeit device. When the activation method 400 is used, the first fuse is blown on the board. Any time the first fuse is blown, the hardware stops tracking the counterfeit counter and proceeds with normal operation. In other words, the activation method 400 simply blows the first fuse if a legitimate customer is encountered. In some embodiments, the first or second fuse may be blown through a charge pump circuit built into the silicon of the component, which steps up the voltage to a high enough level to blow the fuse.

Method 400 begins at processing block 410, where the hardware device is powered up. Then, at processing block 420, the activation method is deployed. At decision block 430, it is determined whether the vendor seeking activation is a legitimate customer. If a legitimate customer is encountered, then at processing block 440, the activation method blows the first fuse. For example, fuse 1 222 of FIG. 2 is blown. If a legitimate customer is not encountered, then the first fuse is not blown, and the counterfeit counter is activated and begins tracking the hardware device at processing block 450.

There are several options for an activation method to deploy with respect to method 400. Determining the activation method is a detail of implementation. However, some suggestions are included for illustration purposes. In one embodiment, in the case of a networking device, software is given to legitimate vendors or customers along with a username and password. The originating organization then takes the IP address of the vendor or customer and stores this on an activation server. The vendor or customer can then activate the product over the internet authenticating with a username, password, and IP address which a counterfeiter should not have. When the adapter receives a "special" packet, the device blows the first fuse and becomes activated.

Another embodiment for activation is for the product to be physically activated by an employee of the originating organization that works on-site in the manufacturing environment (e.g., using hardware equipment to blow the fuses). Yet another embodiment for activation may include the originating organization providing an activation device that is unique and expensive to duplicate to be used on the manufacturing line. In any case, activating the product may be done using a number of different methods. The above activation examples are not foolproof. They are described in order to illustrate the various possible implementations and are not intended to be limiting.

Figure 5:
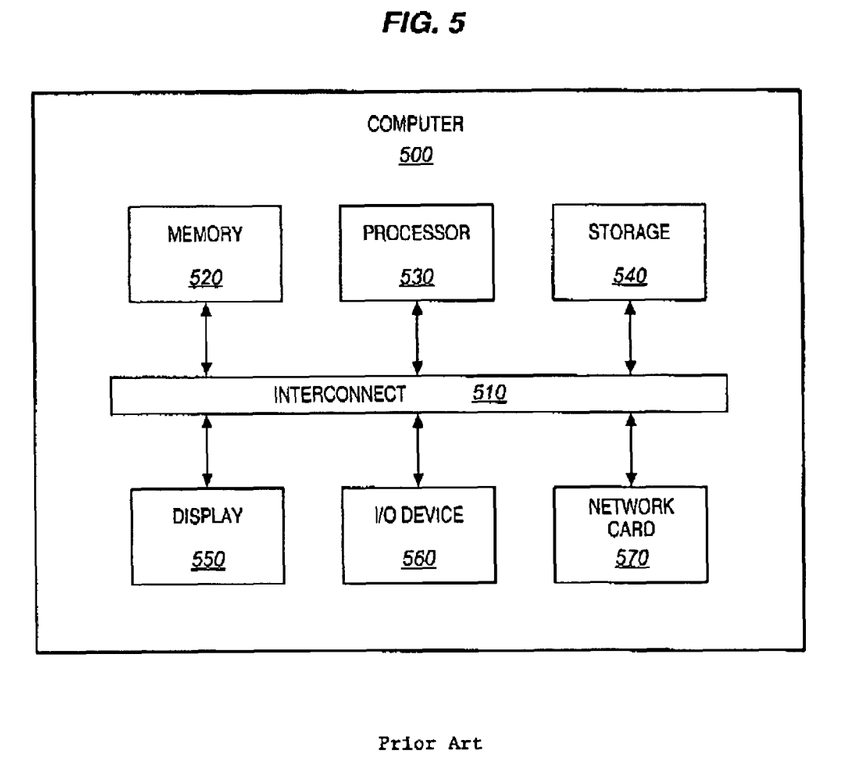
FIG. 5 is a block diagram of one embodiment of a computer system.

Referring to FIG. 5, a computer system in accordance with embodiments of the invention is shown. Computer system 500 may operate using the counterfeit fuse mechanism in accordance with embodiments of the invention, as described below.

In some embodiments, computer system 500 may be a personal computer, a desktop computer, a mobile computer, a laptop computer, a notebook computer, a Personal Digital Assistant (PDA) device, a tablet computer, a network device, a network, an internal and/or external modem, fax-modem device and/or card, a peripheral device, a WLAN device, or the like.

In the exemplary embodiment of FIG. 5, computer system 500 may include a memory unit 520, a processor 530, a storage unit 540, a display unit 550, an input/output (I/O) device 560, and a network card 570, all communicatively coupled through interconnect 510.

Processor 530 may include, for example, a Central Processing Unit (CPU), a Digital Signal Processor (DSP), or any suitable specific, general, or multi-purpose processor or micro-processor. In some embodiments, the terms processor and central processing unit (CPU) may be used interchangeably. In one embodiment, processor 530 is a processor in the Pentium® family of processors including the Pentium® IV processors available from Intel Corporation of Santa Clara, Calif. Alternatively, other processors may be used. In a further embodiment, processor 530 may include multiple processor cores. In other embodiments, processor 530 may be a dual-core processor.

Memory 520 may include, for example, a Random Access Memory (RAM). Storage unit 540 may include, for example, a hard disk drive. Display unit 550 may include, for example, a monitor. I/O device 560 may include, for example, a keyboard, a mouse, or a touch-pad.

Network card 570 may be a network adapter including the counterfeit-mode fuses in accordance with embodiments of the invention. In one embodiment, network card 570 may include, for example, a modem able to operate in accordance with one or more of the existing 802.11a, 802.11b, 802.11g, 802.11n standards and/or any future versions of these standards, or any other suitable existing or future versions of these standards.

It is noted that computer system 500 may include various other components and may be configured with additional or alternative units. Further, computer system 500 may be implemented using any suitable combination of hardware and/or software, and may include any circuit, circuitry, unit, or combination of integrated or separate units or circuits, as are known in the art, to perform desired functionalities.

It is noted that the terms "circuit" and "circuitry" as used herein, may include any suitable combination of hardware components and/or software components. For example, computer system 500 may include detection circuitry, analysis circuitry, selection circuitry, comparison circuitry, processing circuitry, reception circuitry, engagement circuitry, reset circuitry, storage circuitry, one or more analyzer units, comparison units, decision units, processing units, storage units, detection units, buffers, memories, and various other types of units, components, and/or circuitry, which may be used to perform methods and operations as discussed below in accordance with exemplary embodiments of the invention, and which may be implemented using any suitable combination of hardware components and/or software components (including, for example, applications, drivers, and/or operating systems) of computer system 500.

In the above description, numerous specific details such as logic implementations, opcodes, resource partitioning, resource sharing, and resource duplication implementations, types and interrelationships of system components, and logic partitioning/integration choices may be set forth in order to provide a more thorough understanding of various embodiments of the invention. It will be appreciated, however, to one skilled in the art that the embodiments of the invention may be practiced without such specific details, based on the disclosure provided. In other instances, control structures, gate level circuits and full software instruction sequences have not been shown in detail in order not to obscure the invention. Those of ordinary skill in the art, with the included descriptions, will be able to implement appropriate functionality without undue experimentation.

The various embodiments of the invention set forth above may be performed by hardware components or may be embodied in machine-executable instructions, which may be used to cause a general-purpose or special-purpose processor or a machine or logic circuits programmed with the instructions to perform the various embodiments. Alternatively, the various embodiments may be performed by a combination of hardware and software.

Various embodiments of the invention may be provided as a computer program product, which may include a machine-readable medium having stored thereon instructions, which may be used to program a computer (or other electronic devices) to perform a process according to various embodiments of the invention. The machine-readable medium may include, but is not limited to, floppy diskette, optical disk, compact disk-read-only memory (CD-ROM), magneto-optical disk, read-only memory (ROM) random access memory (RAM), erasable programmable read-only memory (EPROM), electrically erasable programmable read-only memory (EEPROM), magnetic or optical card, flash memory, or another type of media/machine-readable medium suitable for storing electronic instructions. Moreover, various embodiments of the invention may also be downloaded as a computer program product, wherein the program may be transferred from a remote computer to a requesting computer by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A method comprising:
    operating a hardware device in a normal mode upon determining that a first indicator for the hardware device is set, wherein the first indicator when set indicates that the device is not a counterfeit device, and if the first indicator is not set, then:
    operating the hardware device in the normal mode;
    activating a counter;
    setting a second indicator when the counter expires; and
    operating the hardware device in a counterfeit mode when the second indicator is set, wherein the counterfeit mode identifies the hardware device as a counterfeit device; and
    wherein the first and second indicators are hardware fuses, and wherein setting the first and second indicators includes blowing the hardware fuses by utilizing a charge pump circuit to increase the voltage to the hardware fuses.

2. The method of claim 1, wherein the first indicator is set via an activation method that determines whether the hardware device is a counterfeit device.

3. The method of claim 2, further comprising if the first indicator is set, operating the hardware device in a normal mode, wherein the normal mode indicates that the hardware device is not a counterfeit device.

4. The method of claim 1, wherein the hardware device is a network adapter.

5. The method of claim 1, wherein the counter is set according to a time interval.

6. The method of claim 5, wherein the hardware device operates in a normal made during the time interval before the counter expires, wherein the normal mode indicates that the hardware is not a counterfeit.

7. The method of claim 1, wherein identifying the hardware device as a counterfeit device includes modifying a device ID associated with the hardware device in a memory of the hardware device to indicate the hardware device is a counterfeit device.

8. An apparatus comprising:
    a first fuse;
    a second fuse; and
    counterfeit logic coupled to the first and second fuses, the counterfeit logic to:
    blow the first fuse if a device to which the first and second fuses are connected is not a counterfeit device; and
    blow the second fuse after a predetermined period of operation to indicate that the device is a counterfeit device if the first fuse is not blown and if a counterfeit counter has expired.

9. The apparatus of claim 8, wherein the device operates in a normal mode if the first fuse is blown, wherein the normal mode indicates that the device is not a counterfeit device.

10. The apparatus of claim 8, wherein the device is a network adapter.

11. The apparatus of claim 8, wherein an activation method is applied to the device to determine whether to blow the first fuse.

12. The apparatus of claim 8, wherein indicating that the device is a counterfeit device includes modifying a device ID associated with the device to indicate the hardware device is a counterfeit device.

13. The apparatus of claim 8, wherein the counterfeit counter is set according to a number of transactions during which the device is to operate in a normal mode.

14. A system, comprising:
    a host including a processor and a device driver;
    a circuit card slot included in the host; and
    a network interface card to insert in the circuit card slot, having:
    a first indicator;
    a second indicator; and
    counterfeit logic coupled to the first and second indicators, the counterfeit logic to:
    set the first indicator if a device to which the first and second indicators are connected is not a counterfeit device; and
    if the first indicator is not set and if a counterfeit counter has expired after a predetermined period of operation of the network interface, set the second indicator to indicate that the device is a counterfeit device.

15. The system of claim 14, wherein the device operates in a normal mode if the first indicator is set, wherein the normal mode indicates that the device is not a counterfeit device.

16. The system of claim 14, wherein an activation method is applied to the device to determine whether to set the first indicator.

17. The system of claim 14, wherein indicating that the device is a counterfeit device includes modifying a device ID associated with the device to indicate the hardware device is a counterfeit device.

18. The system of claim 14, wherein the first and second indicators are hardware fuses, and wherein setting the first and second indicators includes blowing the hardware fuses by utilizing a charge pump circuit to increase the voltage to the hardware fuses.

19. An article of manufacture comprising:
a machine-accessible medium including data that, when accessed by a machine, cause the machine to perform operations comprising:
operating a hardware device in a normal mode upon determining that a first indicator for the hardware device is set, wherein the first indicator when set indicates that the device is not a counterfeit device, and if the first indicator is not set, then:
operating the hardware device in the normal mode;
activating a counter;
setting a second indicator when the counter expires; and
operating the hardware device in a counterfeit mode when the second indicator is set, wherein the counterfeit mode identifies the hardware device as a counterfeit device; and
wherein the first and second indicators are hardware fuses, and wherein setting the first and second indicators includes blowing the hardware fuses by utilizing a charge pump circuit to increase the voltage to the hardware fuses.

20. The article of manufacture of claim 19, wherein the machine-accessible medium further includes data that cause the machine to perform operations comprising operating the hardware device in a normal mode if the first indicator on the hardware device is set, wherein the normal mode indicates that the hardware device is not a counterfeit.

21. The article of manufacture of claim 20, wherein the hardware device is a network adapter.

* * * * *